United States Patent
Cloutman et al.

(10) Patent No.: US 8,248,532 B2
(45) Date of Patent: Aug. 21, 2012

(54) METHOD AND APPARATUS FOR PROVIDING A CONTENT CONTROL SIGNAL VIA COLOR BURST PHASE MODIFICATIONS

(75) Inventors: John Cloutman, Tracy, CA (US);
Ronald Quan, Cupertino, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 704 days.

(21) Appl. No.: 12/350,740

(22) Filed: Jan. 8, 2009

(65) Prior Publication Data
US 2010/0171880 A1    Jul. 8, 2010

(51) Int. Cl.
*H04N 9/68* (2006.01)
*H04N 5/91* (2006.01)

(52) U.S. Cl. .......................... 348/577; 386/94

(58) Field of Classification Search ............ 348/577, 348/473, 460, 461, 463, 467, 477–479; 386/252, 386/253, 254, 255, 257
See application file for complete search history.

(56) References Cited

U.S. PATENT DOCUMENTS

| | | | |
|---|---|---|---|
| 4,533,938 A * | 8/1985 | Hurst | 348/577 |
| 4,577,216 A | 3/1986 | Ryan | |
| 4,626,890 A | 12/1986 | Ryan | |
| 4,727,412 A * | 2/1988 | Fearing et al. | 348/577 |
| 5,479,268 A | 12/1995 | Young et al. | |
| 5,583,396 A | 12/1996 | Hideaki et al. | |
| 5,583,936 A | 12/1996 | Wonfor et al. | |
| 5,784,523 A | 7/1998 | Quan et al. | |
| 6,222,978 B1 | 4/2001 | Hirai | |
| 6,327,422 B1 * | 12/2001 | Quan et al. | 386/254 |
| 6,381,747 B1 | 4/2002 | Wonfor et al. | |
| 6,516,132 B1 | 2/2003 | Wrobleski et al. | |
| 6,600,873 B1 | 7/2003 | Brill et al. | |
| 7,015,973 B2 * | 3/2006 | Kim | 348/536 |
| 7,039,294 B2 * | 5/2006 | Quan | 386/255 |
| 7,050,698 B1 | 5/2006 | Quan | |
| 7,057,666 B2 * | 6/2006 | Folio | 348/473 |

(Continued)

FOREIGN PATENT DOCUMENTS

| | | |
|---|---|---|
| WO | WO-96/36174 A2 | 11/1996 |
| WO | WO-96/36174 A3 | 11/1996 |
| WO | WO-2005/039176 A1 | 4/2005 |
| WO | WO-2005/039176 C1 | 4/2005 |
| WO | WO-2011/034774 A1 | 3/2011 |

OTHER PUBLICATIONS

International Search Report mailed on Jul. 27, 2010, for PCT Application No. PCT/US2010/020532, filed on Jan. 8, 2010, three pages.

(Continued)

*Primary Examiner* — Paulos Natnael
(74) *Attorney, Agent, or Firm* — Morrison & Foerster LLP

(57) ABSTRACT

The "color stripe" process is well known in the video field for preventing copying by analog video tape recorders of video content, and operates by altering the phase of a portion of the video signal color burst. Here, a weakened version of the color stripe process is employed in a video signal whereby the color burst phase alterations are reduced or attenuated so there is no copy prevention effect on a typical video tape recorder. However the weakened color stripe process is still sufficient to be detectable by a suitable detector located in a compliant device, so the detected presence of the color stripe serves as an encoded indication of copy control or other content control for the video signal by the compliant device.

27 Claims, 5 Drawing Sheets

U.S. PATENT DOCUMENTS

| | | | | |
|---|---|---|---|---|
| 7,071,995 B1 * | 7/2006 | Horlander | | 348/478 |
| 7,116,375 B2 * | 10/2006 | Horlander | | 348/478 |
| 7,395,545 B2 | 7/2008 | Wonfor et al. | | |
| 7,586,541 B2 * | 9/2009 | Chupp et al. | | 348/473 |
| 7,865,057 B2 * | 1/2011 | Hollar | | 386/252 |
| 2003/0049016 A1 | 3/2003 | Wrobleski et al. | | |
| 2003/0149980 A1 | 8/2003 | Hassell et al. | | |
| 2004/0111740 A1 | 6/2004 | Seok et al. | | |
| 2005/0141876 A1 * | 6/2005 | Quan | | 386/94 |
| 2006/0083373 A1 | 4/2006 | Ryan et al. | | |
| 2006/0085863 A1 | 4/2006 | Ryan et al. | | |
| 2008/0276325 A1 | 11/2008 | Quan | | |
| 2008/0309816 A1 * | 12/2008 | Quan et al. | | 348/441 |
| 2009/0202215 A1 | 8/2009 | Tan | | |
| 2009/0296807 A1 * | 12/2009 | Cloutman | | 375/240.01 |
| 2011/0069938 A1 | 3/2011 | Quan et al. | | |
| 2011/0206343 A1 | 8/2011 | Quan | | |
| 2011/0235999 A1 | 9/2011 | Quan et al. | | |

OTHER PUBLICATIONS

Written Opinion mailed on Jul. 27, 2010, for PCT Application No. PCT/US2010/020532, filed on Jan. 8, 2010, four pages.

International Report on Patentability mailed on Jul. 12, 2011, for PCT Application No. PCT/US2010/020532, filed on Jan. 8, 2010, five pages.

International Search Report mailed on Jul. 6, 2011, for PCT Application No. PCT/US2011/030377, filed on Mar. 29, 2011, four pages.

International Search Report mailed on Mar. 1, 2011, for PCT Application No. PCT/US2010/048292, filed on Sep. 9, 2010, five pages.

Written Opinion mailed on Jul. 6, 2011, for PCT Application No. PCT/US2011/030377, filed on Mar. 29, 2011, eight pages.

Written Opinion mailed on Mar. 1, 2011, for PCT Application No. PCT/US2010/048292, filed on Sep. 9, 2010, five pages.

U.S. Appl. No. 13/163,520, filed Jun. 17, 2011, Quan et al. (Copy not attached).

* cited by examiner

METHOD AND APPARATUS FOR PROVIDING A CONTENT CONTROL SIGNAL VIA COLOR BURST PHASE MODIFICATIONS

FIELD OF THE INVENTION

This disclosure pertains to video recording and video content control.

BACKGROUND OF INVENTION

This disclosure pertains to video content control detection systems, and in particular, to Macrovision Corp. compliant "color stripe" signal detectors of the type often embedded in commercially available integrated chip sets used in video recorders or other Macrovision Corp. compliant video devices. It is known that such a color stripe detector is able to read or detect properly the Macrovision Corp. color stripe copy protection signals when an entire video color burst is phase modified or when a majority of the color burst is so phase modified.

However, such a color stripe signal, well known from Ryan U.S. Pat. No. 4,577,216 incorporated by reference in its entirety, is primarily a copy protection video signal, which is generally playable on a TV (television) set, but which causes an analog video cassette recorder (VCR) to play back a recorded signal with color errors. In the PAL TV standard, synthesizing a playable color stripe signal with negligible display artifacts while providing an effective copy protection signal on a VCR or other video tape recorder is a challenge. For example, the more effective the color stripe signal is on a particular video tape recorder in preventing copying, the more likely that playability artifacts (on a TV display) are noticeable. Some PAL color stripe processes are not commercially viable because of such display artifacts, and thus not implemented.

In recent years with the decline in VCR sales or usage, newer video recorders such as digital personal video recorders have replaced the VHS (analog) video tape recorders. These newer digital video recorders use a different type of recording system, which includes a detection system as explained above for reading or detecting the incoming color stripe signal. Once a color stripe copy protection signal is detected in a video signal, a content control command is generated, such as "Prohibit Recording/Viewing". A compliant device can then accept the content control command to stop recording or to replace/mute the program video signal with another signal such as a blue screen. Brill et al., U.S. Pat. No. 6,600,873 incorporated by reference in its entirety, discloses how a device such as a video recorder includes special detection circuitry to detect the color stripe process and producing in response a control signal which disables the recorder, to prevent further recording. The same concept is embodied in commercially available integrated circuit video decoders which detect the color stripe process and in response issue commands to control operation (such as no recording) of a device such as a video set top box, personal video recorder or other in which the video decoder is installed. Such video decoders are generally referred to as "Macrovision compliant". Examples are the Texas Instruments TVP5146 video decoder and the Micronas AVF4910B video pixel decoder. See also Macrovision Corp. patent publication WO 2005/039176A1 disclosing use of analog copy protection to encode permitted use information.

SUMMARY OF THE INVENTION

One goal of the present approach is to define the limits of color stripe signal detection thresholds on commercially available detection systems and provide a modified or weakened color stripe signal that is detectable, but not necessarily effective as a copy protection signal on a VCR or other video tape recorder. Ryan U.S. Pat. No. 4,626,890 and Quan et al. U.S. Pat. No. 5,784,523 both incorporated by reference in their entirety, show ways to defeat the effects of color stripe signals by removing the incorrect phase in at least a portion or the whole of a color burst envelope.

Normally one would conclude that by modifying a color stripe signal so as to defeat its color copy protection effects, the color stripe signal would also be not detectable in a compliant content control system. But the present inventors have found that one or more "defeat" aspects of Quan et al. U.S. Pat. No. 5,784,523 can be applied to improve playability of a video signal on a TV display set while defeating color copy protection effects on a video tape recorder and still allowing color stripe detection in a compliant device (e.g., to cause the compliant device to prevent recording).

Another goal is to combine this modified or "weakened" or "defeated" color stripe signal with other well known copy protection waveforms such as pseudo sync and/or AGC pulses. Also, one may combine the weakened color stripe signal with other copy protection methods such as sync narrowing, level shifting a portion of the video signal such as a lowered portion of a front or back porch region or an active field (e.g., when compared to another portion of the video signal such as a portion of the vertical blanking interval).

Yet another goal is to generate two or more types of defeated or weakened color stripe signals such that when combined with other waveforms, different types or levels of copy protection can be identified such as the well known Macrovision Corp. Type 2 or Type 3 or Type n. A Type n copy protection signal can be linked to the well known APS (analog protection system) trigger bits that are used in video media players such as DVD players and/or television set top boxes or the like.

Yet another goal is to provide a segmented weakened color stripe signal that is detectable by a detection system, but does not show appreciable color copy protection effectiveness on a video tape recorder.

Yet another goal is to provide a weakened color stripe signal color burst modification which also has an extended color burst envelope. For example, a normal color burst includes about 8 to 10 cycles of subcarrier frequency (e.g., 4.43 MHz). Embodiments of the invention include greater than 10 cycles of subcarrier for the color burst modification.

Another embodiment includes generally more subcarrier cycles of substantially normal phase than cycles of incorrect phase in the weakened color stripe signal (e.g., the color stripe signal is reduced or weakened in providing the above described color copy protection effects to a (PAL) standard video tape recorder). In Wrobleski et al. U.S. Pat. No. 6,516,132 incorporated by reference in its entirety, a color stripe signal with improved playability but which is copy prevention effective is provided having at least equal or more in number of subcarrier cycles of incorrect phase compared to the number of subcarrier cycles of correct (normal) phase. Commercially available color stripe detectors, as referred to above, by design do detect this type of color stripe signal. In one example, in Wrobleski et al. two cycles of added incorrect phase form an extended color stripe color burst envelope to provide an effective color copy protection signal to a VCR, and to afford detection by such color stripe detectors.

Embodiments of the invention thus utilize color stripe modifications of the general type shown in Wrobleski et al. In Wrobleski et al., segmented (partial) color burst modifications provide a reduced or defeated or weakened copy protection effect by generally providing a color burst with fewer cycles of incorrect color burst phase than those with correct (normal) phase. The present inventors have found that one or more of this type of color burst modifications which is weakened is detectable in a commercially available color stripe reader/detector. In an example, two subcarrier cycles of normal (correct) phase are added to the color burst to form an extended color stripe color burst envelope to provide reduced or defeated color copy protection effectiveness on a VCR, and also to still provide color stripe detection for content control purposes.

For example, in one version of a "defeated" color stripe PAL signal (e.g., a two video line color stripe color burst signal with more cycles of normal phase than incorrect phase), which was recorded, negligible color stripe effects were observed upon playback of the video by a VHS type VCR. Yet this "defeated" color stripe PAL signal was detected successfully (as a color stripe signal) by an available Macrovision compliant video decoder.

Embodiments of the invention (using a weakened or defeated color stripe signal) may be combined with any known copy protection enhancement signal (e.g., level shifting a portion of the video signal or any waveform described in Wonfor et al. U.S. Pat. No. 5,583,936 incorporated by reference in its entirety) any part of a basic copy protection signal such as AGC and/or pseudo sync pulses, and/or any modification in one or more sync signals (e.g., sync amplitude, sync level shifting, sync width modification, and/or sync position modification).

DETAILED DESCRIPTION

Figure 1A:
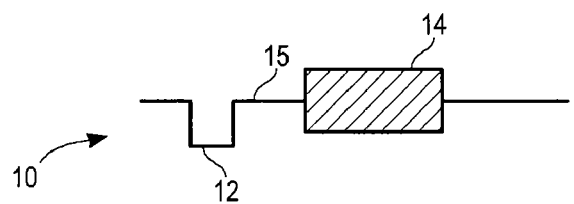
FIG. 1A shows in the prior art an effective copy protection color stripe signal.

FIG. 1A shows a prior art video waveform 10 which is a mostly conventional TV horizontal blanking interval having horizontal sync pulse 12, color burst 14 and breezeway 15 but wherein 8 to 10 subcarrier cycles of the color burst 14 (indicated by the hatching) are modified in phase to about 180 degrees from the normal (conventional) phase. Conventionally the horizontal axis is time and the vertical axis voltage. Ryan U.S. Pat. No. 4,577,216 teaches that a number of horizontal lines of a video signal with this type of modified color burst 14 yields effective copy protection when applied to a video tape recorder. The hatched color burst 14 denotes the incorrect (modified) phase (also referred to as phase angle) such as a departure of 180 degrees from the normal color burst phase angle of zero degrees of a color video signal for these subcarrier cycles.

Figure 1B:
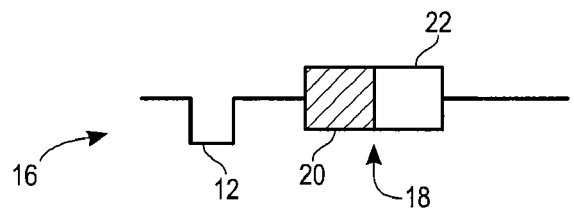
FIG. 1B shows in the prior art a copy protection effective split burst (segmented) color stripe signal.

FIG. 1B, also showing a prior art waveform 16, is a variation of FIG. 1A in which at least half the cycles of an entire color burst envelope 18 are shifted so as to have an incorrect burst phase. In this example, the color burst envelope 18 is a "split" (segmented) color burst illustrated as a hatched portion 20 of incorrect phase and a second portion 22 of correct phase. For an effective copy protection signal to produce noticeable color distortion when recorded by a VCR, at least half of the total burst envelope 18 duration is modified to the incorrect phase 20. For example, the duration of the hatched incorrect portion 20 is equal or greater than the correct portion 22 in burst envelope 18. Such a waveform may also include an extended color burst envelope 18 wherein cycles of preferably incorrect phase start ahead of a normal color burst envelope, as explained below.

Figure 1C:
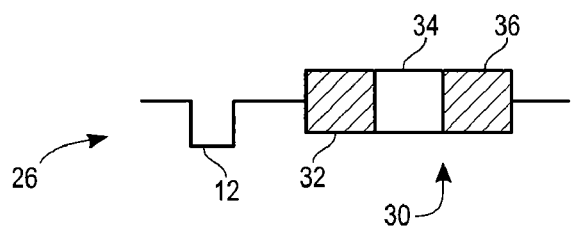
FIG. 1C shows in the prior art another effective split burst copy protection signal.

FIG. 1C shows another variation of FIG. 1A, which provides an effective (in terms of copy prevention) color copy protection signal 26 to a video recorder. In this example, the color burst envelope 30 is segmented (split) into three (or more) portions 32, 34, 36. Again, the hatched areas 32, 36 denote incorrect color burst phase while middle portion 34 denotes normal color burst phase. In general, as long as there are more subcarrier cycles of incorrect phase than normal or correct color phase, the modified color burst 30 provides an effective copy protection signal. Here the total duration or number of subcarrier cycles of the portions 32, 36 is greater (or equal) than the middle portion 34 to provide an effective color stripe signal.

Figure 2A:
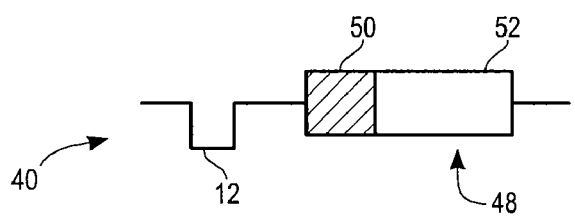
FIGS. 2A and 2B show "defeated" color stripe signals used in accordance with the invention.

FIG. 2A illustrates a weakened color stripe waveform 40 used in an embodiment of the invention. Here modified color burst 48 has fewer cycles of incorrect phase angle in section 50 than cycles of correct phase angle in section 52. While this type of modified burst 48 is disclosed in Quan et al. as a way to defeat or reduce copy protection effectiveness or to improve on playability effects, the present inventors have found that this "defeated" or weakened color stripe signal is still detectable by commercially available color stripe detectors of the type described above.

Although the color stripe incorrect phase angle may be in the range of 20 degrees to 180 degrees (normal phase angle being 0°), in some examples a phase of about 180 degrees for the incorrect burst phase portion is preferable to a smaller phase shift. For example, in some PAL TV displays (TV sets or monitors), providing a modified phase of 90 degrees causes more noticeable playability artifacts than a modified phase of 180 degrees. When choosing an incorrect subcarrier phase from 20 to 180 degrees, intuitively it would seem that a phase angle less than 180 degrees would cause less playability artifacts (display problem). Thus it would seem that 90 degrees of phase shift would cause fewer display problems than 180 degrees of phase shift. Experimentally, it has been found that 180 degrees of phase shift for a color stripe burst, whether for a weakened or effective copy protection color stripe, actually causes less or fewer display artifacts than a 90 degree phase shifted color burst. So preferably, a weakened version of the color stripe here has in one embodiment 180 degrees of phase shift.

Figure 2B:
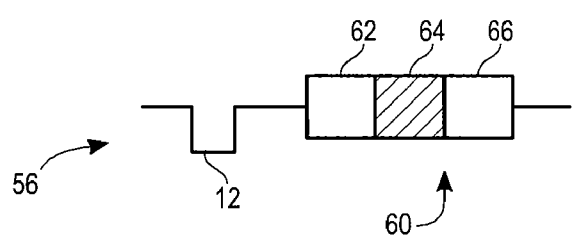

In another variation of such a defeated or reduced effectiveness copy protection signal, FIG. 2B shows a video signal 56 having a modified color burst 60, which as in FIG. 1C is a segmented (split) color burst. In this example of three segments 62, 64, 66 in the modified color burst signal 60, the number of incorrect phase subcarrier cycles is again less that the total number of correct phase subcarrier cycles. For example, the summed duration of the first and third segments 62, 66 with normal phase angle subcarrier cycles exceeds the middle segment's 64 duration, wherein the middle segment 64 includes the incorrect phase angle cycles.

Figure 2C:
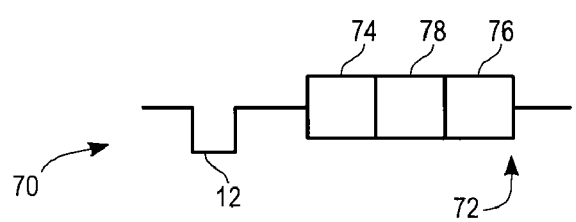
FIGS. 2C to 2F show additional defeated color stripe signals.

FIG. 2C shows a video signal 70 having a weakened and segmented color burst 72 wherein incorrect phase angle color burst subcarrier cycles are in segments 74, 76, 78, and wherein correct phase angle color burst phase subcarrier cycles are in modified color burst segments 74, 76, 78 such that there are more subcarrier cycles of correct phase angle than incorrect phase angle. In some instances, the segment(s) that would include correct phase angle cycles may be blanked or attenuated. In other instances, the cycles of incorrect phase angle may have a lower amplitude level/magnitude than the correct phase angle cycles. Hence in an embodiment of the invention, it is possible to have more subcarrier cycles of incorrect phase angle than subcarrier cycles of correct phase angle, provided that one or more incorrect phase angle subcarrier cycles is sufficiently attenuated (e.g., reduced in amplitude, or blanked).

For example in general, the modified color burst 72 may include segments 74, 76, 78 with set (or programmed) amplitude, position, and/or phase angle. This means that each segment or section can be programmed in terms of amplitude, position or phase switch point, and/or phase angle such as 180 degrees. Color burst 72 represents a generic signal that can be provided in any Macrovision Corp. compliant (certified) integrated circuit for DVD players, etc.

Figure 2D:
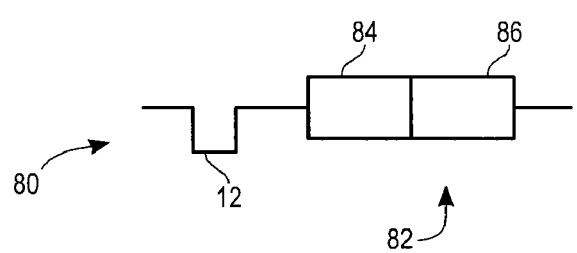
Figure 2E:
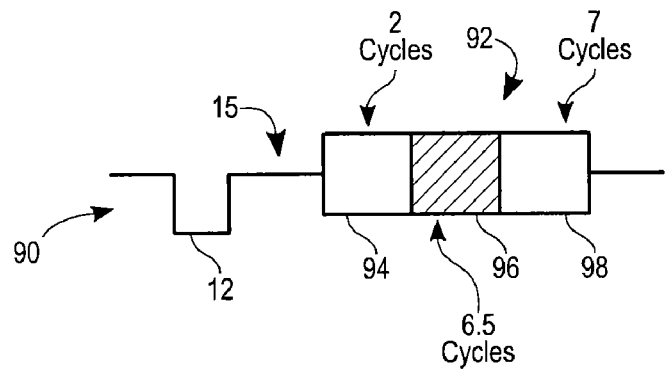
Figure 2F:
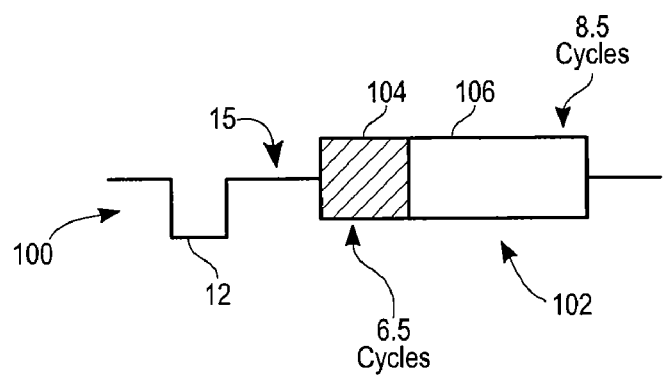

Similarly, in FIG. 2D for a video signal 80 having a two segment modified color burst 82, there are segments 84, 86. The position and/or duration of segments 84, 86 may be defined. This means that the phase transition or phase switch point in the split burst may be moved or varied in position, and that number of subcarrier cycles within each segment may be set to a specific number or cycles to provide a duration in each section of the modified color burst signal. So in one embodiment as described above, segment 84 may include "M" number of cycles of incorrect phase angle followed by segment 86 with "N" number of cycles of correct phase angle (or vice versa), where preferably, N>M. Segment 84 may include cycles of subcarrier advanced or before the start of a normal burst envelope (e.g., include cycles of subcarrier in at least a portion of a breezeway after a trailing edge of a sync pulse or modified sync pulse). FIGS. 2E and 2F are specific examples of the weakened color stripe signal, whereas FIGS. 2C and 2D are general examples.

FIG. 2E shows an embodiment similar to that of FIGS. 2A to 2D for PAL (or NTSC) TV standard video. For a video signal horizontal blanking interval 90 having a 4 or more line (per band) colorstripe signal in color burst 92, in segment 94 two cycles of normal phase angle are followed by a segment 96 having 6.5 cycles of incorrect phase angle, followed by segment 98 with 7 cycles of correct phase angle. Note that the number of cycles per color burst may be varied within +/−10%. Here segment 94 may extend into the breezeway 15.

FIG. 2F shows another embodiment for PAL (or NTSC) TV standard video for a video signal 100 having color burst 102 wherein a two or more horizontal line (per band) colorstripe signal has 6.5 subcarrier cycles of incorrect phase angle in segment 104 extending into the breezeway 15 followed by 8.5 cycles of correct phase angle in segment 106. Note again that the number of cycles may vary within +/−10%. Here segment 104 may extend into the breezeway 15.

Figure 3:
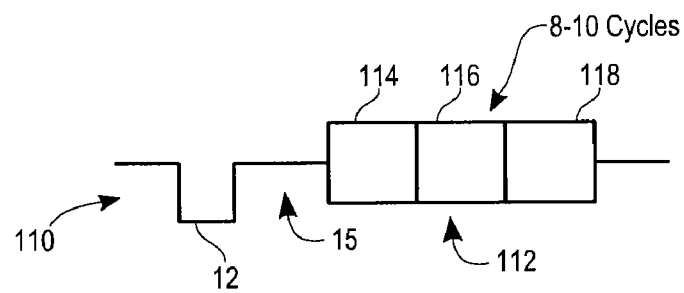
FIG. 3 shows a prior art color burst of normal phase and modified duration.

FIG. 3 shows for video signal 110 an extended color burst 112 with segment 116 having correct phase angle, wherein a segment 114 of several cycles of correct phase angle is added in the breezeway area 15 and a segment 118 is added extending after the normal burst envelope 116 for at least some of the non-colorstripe TV horizontal lines, in accordance with the invention. By extending the duration of the burst envelope with correct phase angle, playability may be improved. For instance, when combined with colorstripe signals that have extended burst duration, color burst duration may be extended (e.g., with cycles of incorrect and/or correct phase angle) in the examples of FIG. 2A, 2B, 2E or 2F.

Figure 4:
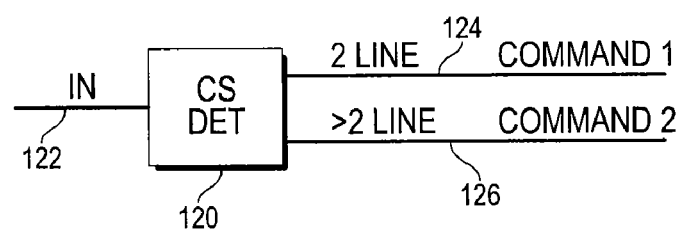
FIG. 4 shows a color stripe detector in accordance with the invention.

FIG. 4 shows a generic example of a color stripe (CS) detector 120 which senses color stripe waveforms in accordance with the invention which are applied at input terminal 122 and which outputs in response one or more (command) signals on terminals 124, 126. Detector 120 may be implemented a number of ways including as a phase detector (e.g., multiplier) or a burst continuation circuit, as explained in more detail below. The burst continuation circuit provides internally a substantially normal phase angle signal to be compared with the phase angle modifications of the input waveforms. The resulting (e.g., command) signals on terminals 124, 126 may for example, be a particular bit (digital) pattern signal "Command 1" when a weakened two line color stripe signal in accordance with the invention is read (detected). When a greater than two line weakened color stripe signal is read, a similar or different bit pattern signal "Command 2" may be generated. In FIG. 4 for example, when a two line weakened color stripe input signal is sensed, the "Command 1" signal is output, which can then control a device to add or encode or re-encode on the well known "Type 2" Macrovision Corp. compliant signals for copy control. Such a Type 2 signal would include or encode or re-encode a same (weakened or non effective) or different (an effective) color stripe signal and/or one or more of the following copy protection signals:

1) AGC pulses and/or Back Porch Pulses
2) Lowered portion of an active field
3) Pseudo sync pulses
4) N line color stripe signal Similarly for a greater than two line weakened color stripe input signal that is detected, the "Command 2" signal output on terminal 126 may produce the well known Type 3 Macrovision Corp. APS signal including the same or different color stripe signal as mentioned above and/or any of waveforms 1-4 listed above. An effective color stripe signal may include more cycles of incorrect phase angle than cycles of correct phase angle in a horizontal blanking interval, which may include an extended horizontal blanking interval.

Command 1 or 2 may direct a downstream device to mute, switch signal source, or shut down (e.g., upon sensing any of the "defeated" color stripe waveforms).

Figure 5:
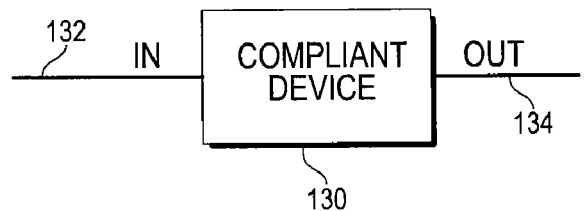
FIG. 5 shows a generic Macrovision compliant device which senses one or more video signal modifications.

FIG. 5 shows a typical compliant device 130 such as a video recorder, analog to digital converter, or video display device having video input terminal 132. Such a device 130 includes a detector 120 as in FIG. 4, and when any waveform in accordance with the invention is sensed, device 130 responsive to the detection stops recording, stops outputting a program video output, scales the video signal, and/or ceases to display the program video. Device 130 may re-encode, upon sensing any of the weakened color stripe signals (in any combination of basic copy protection signals and/or enhancement signals), a similar or different copy protection signal of like resolution (or like TV standard) or different resolution (or different TV standard) and output the resultant signal on terminal 134.

Figure 6A:
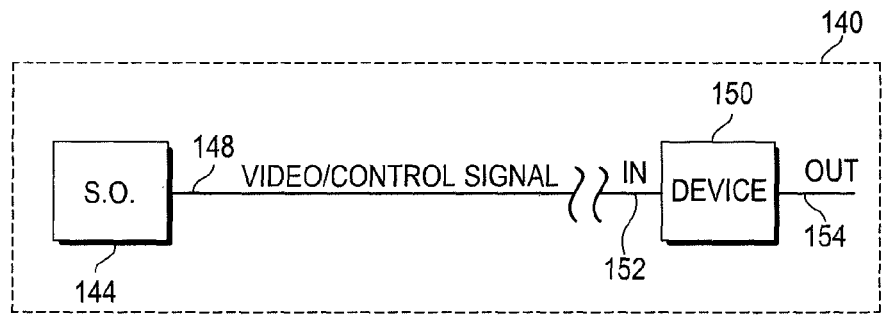
FIG. 6A shows an example of a system operator enabling or controlling one or more video signals in accordance with the invention.

FIG. 6A shows an example of a cable or satellite television distribution system 140 including a system operator (S.O.) 144 that provides or transmits video and control (analog or digital) signals via communications channel 148 to a customer video device 150 (e.g., a set top box, PVR, tuner, display, cell phone, etc.). Channel 148 may be wireless, wired, cable, satellite, WiFi, WiMax, and/or the Internet. The signals on channel 148 may include program video and one or more control bits, bit pattern(s), or programming bits. Upon reception of these signals at terminal 152, remote video device 150 outputs the above described weakened color stripe waveforms when enabled by the control or programming bits or bit pattern(s) sent by system operator 144. Alternatively, device 150 may default to output one or more waveforms in accordance with the invention with or without the system operator transmission of the control or programming bits via channel 148 coupled to input terminal 152 of device 150. The output signal of device 150 at output terminal 154 is typically analog video including one or more weakened color stripe waveforms in accordance with the invention, which may be combined with any copy prevention signal such as pseudo sync pulses, AGC pulses (e.g., in a portion of the horizontal and/or vertical blanking interval), sync modification (e.g., sync reduction, sync level shifting, sync width narrowing/widening, sync position/shifting), and/or level shifting a portion of the video signal. In FIG. 6A the signal on channel 148 is generally a digital signal used in a digital delivery network such as a digital TV set top box without recording capability. FIG. 4 in contrast depicts a detector 120 which is generally used in a device that includes an analog input such as a recorder. This recorder would normally inhibit recording the program video upon detection of the analog weakened color stripe signal. Device 150 in FIG. 6A may include an analog input terminal (not shown), so then device 150 would include the apparatuses of FIGS. 4 and 5, a color stripe detector and recording device. Generally if a compliant device has an analog input terminal, it would include a detection system such as in FIG. 4, and also a compliant recording system as in FIG. 5. So there are actually some digital devices (e.g., a version of device 150) that can be connected to a digital network, where such devices include a recorder, and also accept one or more analog inputs. FIG. 6A thus is an example of how the weakened color stripe signal can be used in a digital delivery network, such as described in Wonfor et al. U.S. Pat. No. 6,381,747.

Figure 6B:
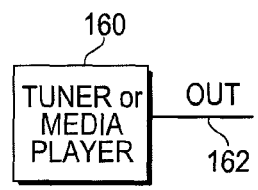
FIG. 6B shows an example of a playback or receiving device enabling, controlling, or providing one or more waveforms in accordance with the invention.

FIG. 6B shows an example of a media player or PVR, tuner, receiver, cell phone, digital media center, set top box, etc. 160 which outputs analog video on line(s) or terminal 162 including one or more color stripe waveforms in accordance with the invention, which may be combined with any pseudo sync, AGC pulses (e.g., in a portion of the horizontal and/or vertical blanking interval), sync modification (e.g., sync reduction, sync level shifting, sync width narrowing/widening, sync position/shifting), and/or level shifting a portion of the video signal. FIG. 6B thus represents various devices that may be connected to a system operator as in FIG. 6A, or a video delivery network not using a system operator as in FIG. 6A. For instance, the video can be sent via a home computer network.

Figure 7A:
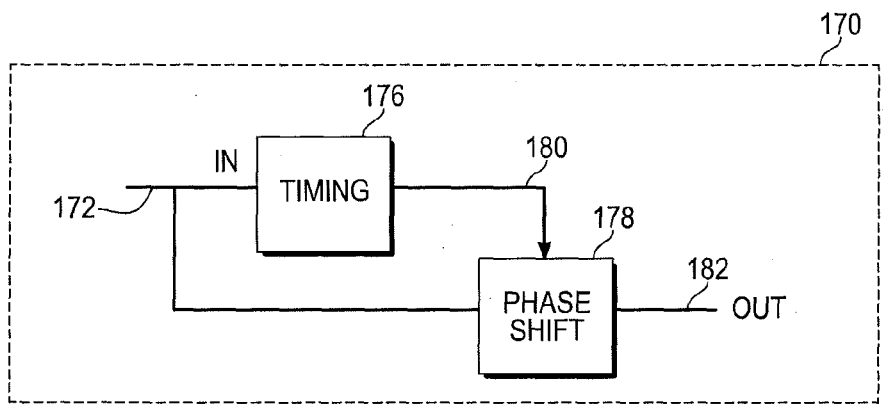
FIG. 7A shows an apparatus to provide one or more waveforms in accordance with the invention.

FIG. 7A shows in a block diagram an example of a generator apparatus 170 to generate weakened color stripe signals in accordance with the invention. The apparatuses of FIG. 7A or 7B or an equivalent circuit/system is present in device 150 or device 160 of FIG. 6A, 6B. A conventional video signal is coupled to input terminal 172, which is coupled to a timing circuit 176. Timing circuit 176 provides a signal (that may be programmable by one or more control bits, not shown) for selected TV horizontal lines and pixels for a modified color burst. The video signal at input terminal 172 is then provided with a color burst signal that is phase shifted by phase shift or phase generating circuit 178 according to the timing output from timing signal circuit 176 on line(s) 180 to provide at output terminal 182 one or more waveforms of weakened color stripe. Phase shift circuit or phase generating circuit 178 may provide or insert a color burst of modified phase and/or duration for one or more segments of the color burst envelope as explained above. The video signal input at terminal 172 may be analog or digital.

Figure 7B:
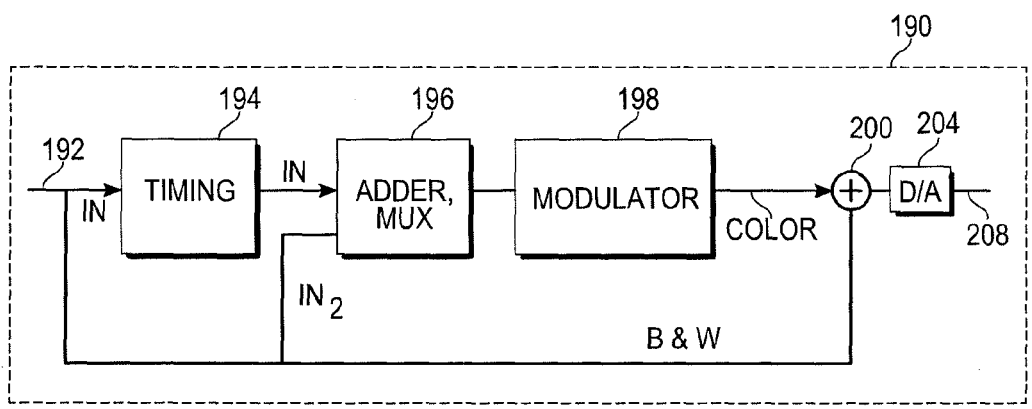
FIG. 7B shows another apparatus to synthesize or provide one or more waveforms in accordance with the invention.

FIG. 7B shows in a block diagram another generator apparatus 190 to generate such weakened color stripe waveforms. The input video signal is coupled to input terminal(s) 192. The video signal is thereby coupled to a timing circuit 194 and the output of timing circuit 194 provides a signal coincident with selected lines and pixels of the video signal for color burst modification. The output of timing circuit 194 is coupled to one input ($IN_1$) of a switching, multiplexing (MUX), inserting, or adding circuit 196. A second input ($IN_2$) to adding circuit 196 is from the video input terminal 192. The output signal from adding circuit 196 then has a modified portion of the horizontal blanking interval and is coupled to a (subcarrier) modulator (e.g., multiplier) circuit 198 to provide a color burst of modified phase, amplitude, position, and/or duration as described above.

Typically the input signal to terminal(s) 192 is a digital component waveform having Y, Pr, Pb component video or the like. The Y component signal is denoted as the black and white video signal (B&W) which is summed by adder 200 to a modulated color signal (via modulator 198) including one or more color burst modifications to provide a composite (digital TV) signal. A digital to analog converter 204 then provides an analog video signal at output terminal 208 that includes one or more color burst modifications in accordance with the invention. It is to be understood that an apparatus as in FIG. 7A, 7B may be included in a video processor/encoder also performing other functions.

Figure 8:
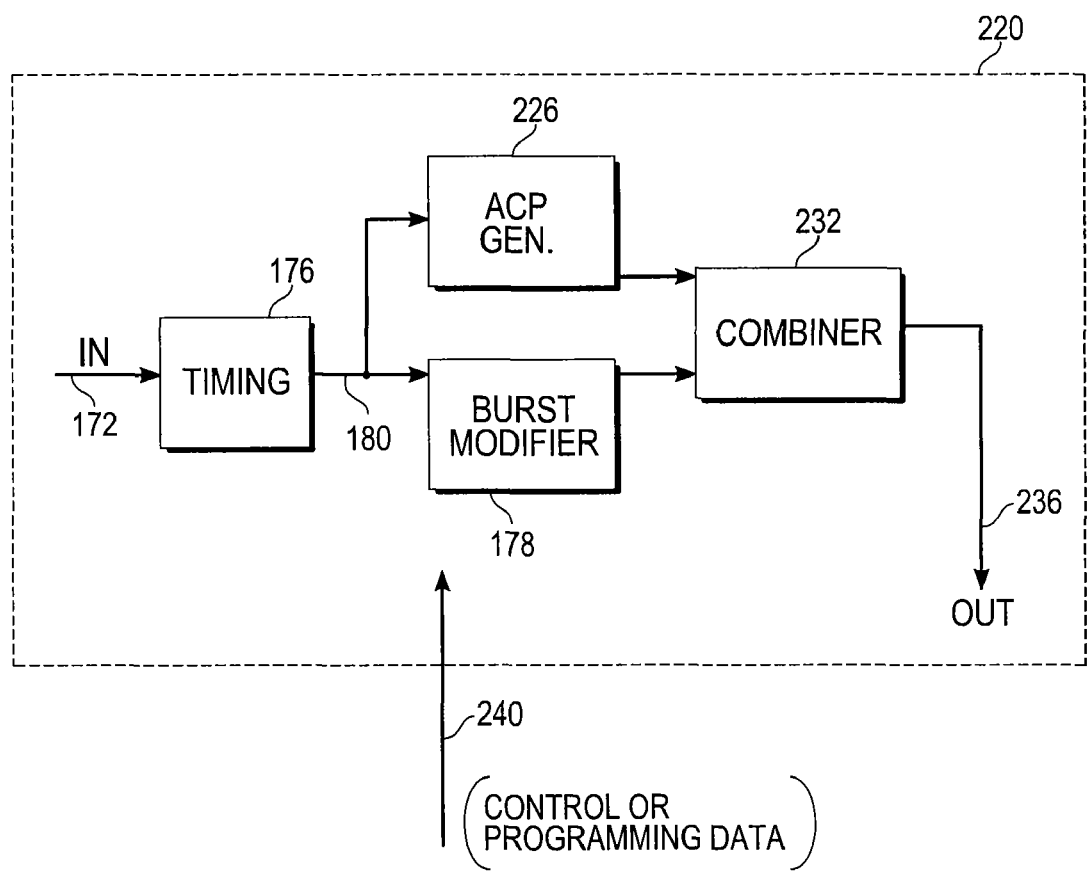
FIG. 8 shows an apparatus to provide one or more waveforms in accordance with the invention and/or one or more basic copy protection signals or enhancement signals.

FIG. 8 shows in a block diagram a typical apparatus (e.g. an integrated circuit or portion thereof) 220, which allows one or more of the present color burst modifications to be combined with one or more basic copy protection signal(s) and/or enhancement signal(s) and is based on the FIG. 7A apparatus. A video signal is coupled to input terminal 172. Timing circuit 176 outputs signals as in FIG. 7A indicating selected lines and pixels for the color burst modification signal, and outputs signals in selected lines and pixels for providing ACP (copy protection) signals, which include:

1) Sync modification(s) such as sync reduction, sync level shifting, sync pulse width, sync amplitude, and/or sync position.
2) One or more pseudo sync pulses in an overscan area.
3) One or more AGC pulses in an overscan area
4) Modulation (e.g., amplitude, frequency, position, pulse-width) of AGC, sync, and/or pseudo sync pulse(s).
5) Level shifting a portion of the video signal.

The output signals of the ACP signal generator 226, and burst modifier (e.g., phase shift or phase generator) circuit 178 are coupled to a combining circuit 232, which outputs a digital and/or analog signal with one or more color burst modifications in accordance with the invention, and which at the output terminal 236 may include any of the ACP signals mentioned above. Configuring, enabling, and/or disabling any of the signals mentioned (ACP and/or color burst modification) may be via a control signal or bit pattern applied at terminal 240. Thus, the (control) signal at 240 includes one or more bits or a bit pattern (e.g., from a system operator, a memory device, storage device, media, etc.).

Figure 9:
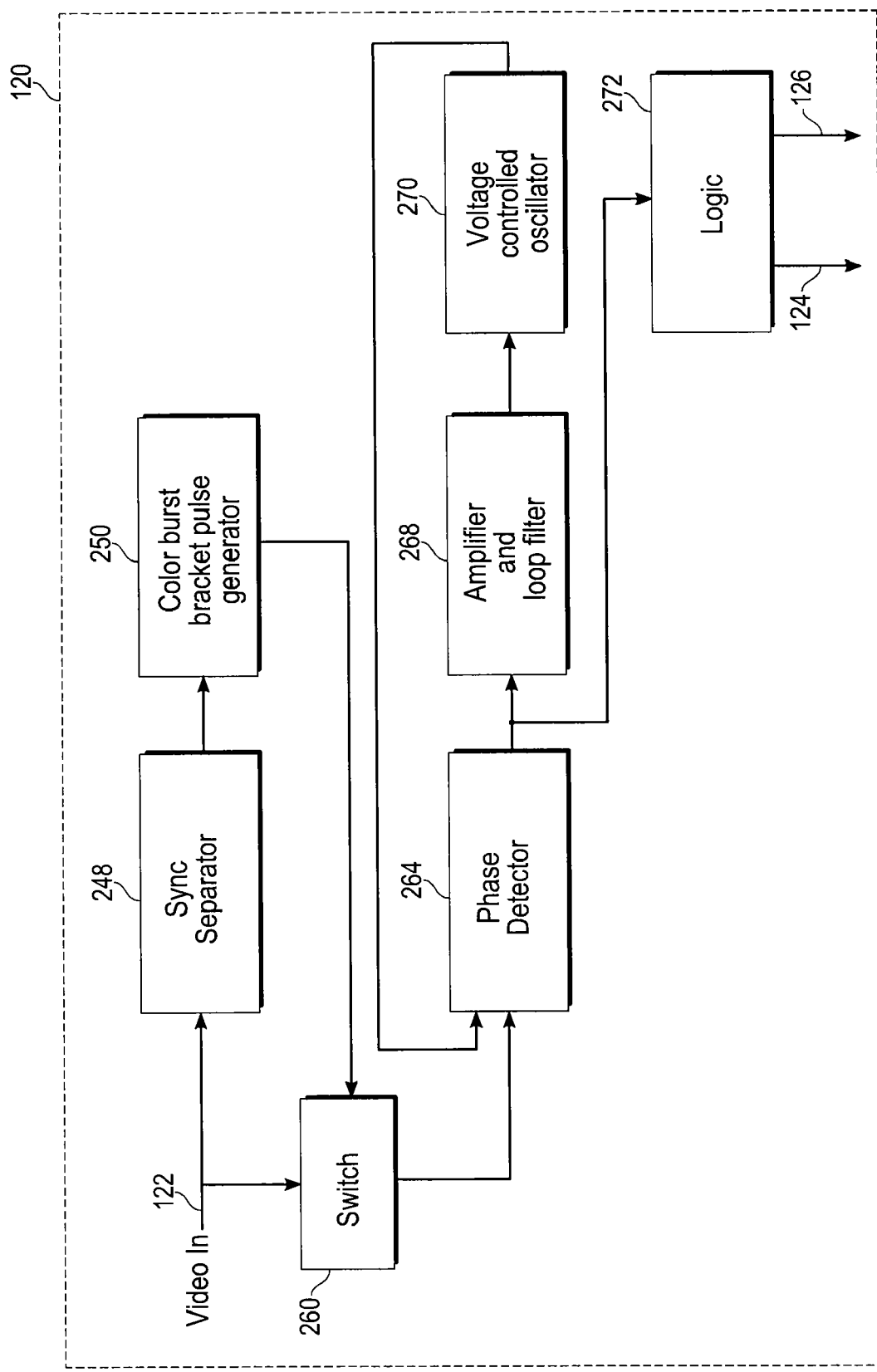
FIG. 9 shows detail of an apparatus as in FIG. 4 to detect waveforms in accordance with the invention.

FIG. 9 shows in a block diagram detail of an exemplary weakened or defeated color stripe detector 130 of FIG. 5, and which is somewhat similar to that of Brill et al. U.S. Pat. No. 6,600,873 referred to above. Like the other devices referred to herein, this may be embodied in its entirety or in part as an integrated circuit. Detector 120 has video input terminal(s) 122 coupled to sync separator 248 to separate out the synchronizing pulses in the input video. The extracted sync pulses drive color burst bracket generator 250 which is, e.g., a mono stable multivibrator outputting a signal of at least 1 μsec duration. The output signal of generator 250 is coupled to the control element of switch 260. Switch 260 thereby couples the input video to phase detector 264 during the expected duration of the color burst. The output of phase detector 264 is coupled to amplifier and loop filter 268, in turn coupled to VCO 270. The output of VCO 270 is coupled to a second input terminal of phase detector 264 to provide a phase lock loop circuit. VCO 270 provides a continuous signal that is phase locked to the average phase of all incoming color burst signals, wherein the majority of color burst signals are of normal phase. Phase detector 264 outputs an indication of incorrect phase to logic 272 which determines, based on the incorrect phase indications, the presence/absence of various versions of the color stripe process and outputs suitable commands on terminals 124, 126 as in FIG. 5. Further, a monostable multivibrator circuit is a type of a timing circuit useful here, as is any type of equivalent circuit such as a (digital) counting circuit to generate a timing pulse.

This disclosure is illustrative and not limiting. Further modification will be apparent to those skilled in the art in light of this disclosure and are intended to fall within the scope of the appended claims.

The invention claimed is:

1. A method of providing a content control indication in a video signal, comprising the acts of:
    receiving a video signal;
    receiving a command;
    modifying the video signal in response to the command to include a weakened color stripe signal in selected lines of the video signal, the weakened color stripe signal being an incorrect color burst in a horizontal blanking interval of the selected lines, wherein the incorrect color burst is detectable but inadequate to prevent an acceptable video tape recording of the modified video signal, whereby the weakened color stripe signal is the indication of content control; and
    outputting the modified video signal, wherein the incorrect color burst includes more subcarrier cycles of correct phase angle than subcarrier cycles of incorrect phase angle.

2. The method of claim 1, wherein the output modified video signal is an analog signal.

3. The method of claim 1, wherein the output modified video signal conforms to one of the NTSC, PAL, or SECAM standards.

4. The method of claim 1, further comprising the acts of:
    providing a copy protection signal; and
    inserting the copy protection signal into the output video signal.

5. A method of providing a content control indication in a video signal, comprising the acts of:
    receiving a video signal;
    receiving a command;
    modifying the video signal in response to the command to include a weakened color stripe signal in selected lines of the video signal, the weakened color stripe signal being an incorrect color burst in a horizontal blanking interval of the selected lines, wherein the incorrect color burst is detectable but inadequate to prevent an acceptable video tape recording of the modified video signal, whereby the weakened color stripe signal is the indication of content control; and
    outputting the modified video signal, wherein the incorrect color burst includes a plurality of subcarrier cycles of incorrect phase angle that are attenuated.

6. A method of providing a content control indication in a video signal, comprising the acts of:
    receiving a video signal;
    receiving a command;
    modifying the video signal in response to the command to include a weakened color stripe signal in selected lines of the video signal, the weakened color stripe signal being an incorrect color burst in a horizontal blanking interval of the selected lines, wherein the incorrect color burst is detectable but inadequate to prevent an acceptable video tape recording of the modified video signal, whereby the weakened color stripe signal is the indication of content control; and
    outputting the modified video signal, wherein the incorrect color burst includes at least a first and a second portion, the first portion having subcarrier cycles of correct phase angle and the second portion having subcarrier cycles of incorrect phase angle.

7. A method of providing a content control indication in a video signal, comprising the acts of:
    receiving a video signal;
    receiving a command;
    modifying the video signal in response to the command to include a weakened color stripe signal in selected lines of the video signal, the weakened color stripe signal being an incorrect color burst in a horizontal blanking interval of the selected lines, wherein the incorrect color burst is detectable but inadequate to prevent an acceptable video tape recording of the modified video signal, whereby the weakened color stripe signal is the indication of content control; and
    outputting the modified video signal, wherein a length of the incorrect color burst is extended beyond that of a normal color burst.

8. A method of providing a content control indication in a video signal, comprising the acts of:
    receiving a video signal;
    receiving a command;
    modifying the video signal in response to the command to include a weakened color stripe signal in selected lines of the video signal, the weakened color stripe signal being an incorrect color burst in a horizontal blanking interval of the selected lines, wherein the incorrect color burst is detectable but inadequate to prevent an acceptable video tape recording of the modified video signal, whereby the weakened color stripe signal is the indication of content control; and
    outputting the modified video signal, wherein a phase angle shift of subcarrier cycles in the incorrect color burst is at least 120° from normal.

9. A method of providing a content control indication in a video signal, comprising the acts of:
   receiving a video signal;
   receiving a command;
   modifying the video signal in response to the command to include a weakened color stripe signal in selected lines of the video signal, the weakened color stripe signal being an incorrect color burst in a horizontal blanking interval of the selected lines, wherein the incorrect color burst is detectable but inadequate to prevent an acceptable video tape recording of the modified video signal, whereby the weakened color stripe signal is the indication of content control; and
   outputting the modified video signal, wherein the weakened color stripe signal encodes one of a plurality of content control states.

10. Apparatus for providing a content control indication in a video signal, comprising:
   a first input terminal for receiving a video signal;
   a timing circuit coupled to the first input terminal;
   a color burst modifying circuit coupled to the timing circuit to generate for selected lines of the video signal a weakened color stripe signal being an incorrect color burst for a horizontal blanking interval of the selected lines, wherein the incorrect color burst is detectable, but inadequate to prevent acceptable video tape recording of the modified video signal;
   a combining element coupled to the first input terminal and to an output terminal of the modifying circuit; and
   a second input terminal for receiving a content control command, and coupled to the combiner; and
   an output terminal coupled to an output terminal of the combiner for outputting a modified video signal responsive to the command, whereby the weakened color stripe in the modified video signal is an indication of the content control.

11. The apparatus of claim 10, wherein the output modified video signal is analog.

12. The apparatus of claim 10, wherein the output modified video signal conforms to one of the NTSC, PAL, or SECAM standards.

13. The apparatus of claim 10, wherein the incorrect color burst includes more subcarrier cycles of correct phase angle than subcarrier cycles of incorrect phase angle.

14. The apparatus of claim 10, wherein the incorrect color burst includes a plurality of subcarrier cycles of incorrect phase angle that are attenuated.

15. The apparatus of claim 10, wherein the incorrect color burst includes at least a first and a second portion, the first portion having subcarrier cycles of correct phase angle and the second portion having subcarrier cycles of incorrect phase angle.

16. The apparatus of claim 10, wherein a length of the incorrect color burst is extended beyond that of a normal color burst.

17. The apparatus of claim 10, further comprising:
   a copy protection signal generator; and
   an adder coupled to the copy protection signal generator for inserting the copy protection signal into the output video signal.

18. The apparatus of claim 10, wherein a phase angle shift of subcarrier cycles in the incorrect color burst is at least 120° from normal.

19. The apparatus of claim 10, wherein the weakened color stripe signal encodes one of a plurality of content control states.

20. Apparatus for controlling use of video content, comprising:
   an input terminal for receiving a video signal;
   a phase detector portion coupled to the input terminal to detect in the video signal a weakened color stripe signal in selected lines of the video signal, the weakened color stripe signal being an incorrect color burst in a horizontal blanking interval of the selected lines, wherein the incorrect color burst is inadequate to prevent acceptable video recording of the modified video signal; and
   a logic circuit coupled to the phase detector portion to generate a signal for controlling use of the video signal responsive to the detection of incorrect phase, wherein the incorrect color burst includes more subcarrier cycles of correct phase angle than subcarrier cycles of incorrect phase angle.

21. The apparatus of claim 20, wherein the input video signal is analog.

22. The apparatus of claim 20, wherein the input video signal conforms to one of the NTSC, PAL, or SECAM standards.

23. Apparatus for controlling use of video content, comprising:
   an input terminal for receiving a video signal;
   a phase detector portion coupled to the input terminal to detect in the video signal a weakened color stripe signal in selected lines of the video signal, the weakened color stripe signal being an incorrect color burst in a horizontal blanking interval of the selected lines, wherein the incorrect color burst is inadequate to prevent acceptable video recording of the modified video signal; and
   a logic circuit coupled to the phase detector portion to generate a signal for controlling use of the video signal responsive to the detection of incorrect phase, wherein the incorrect color burst includes a plurality of subcarrier cycles of incorrect phase angle that are attenuated.

24. Apparatus for controlling use of video content, comprising:
   an input terminal for receiving a video signal;
   a phase detector portion coupled to the input terminal to detect in the video signal a weakened color stripe signal in selected lines of the video signal, the weakened color stripe signal being an incorrect color burst in a horizontal blanking interval of the selected lines, wherein the incorrect color burst is inadequate to prevent acceptable video recording of the modified video signal; and
   a logic circuit coupled to the phase detector portion to generate a signal for controlling use of the video signal responsive to the detection of incorrect phase, wherein the incorrect color burst includes at least a first and a second portion, the first portion having subcarrier cycles of correct phase angle and the second portion having subcarrier cycles of incorrect phase angle.

25. Apparatus for controlling use of video content, comprising:
   an input terminal for receiving a video signal;
   a phase detector portion coupled to the input terminal to detect in the video signal a weakened color stripe signal in selected lines of the video signal, the weakened color stripe signal being an incorrect color burst in a horizontal blanking interval of the selected lines, wherein the incorrect color burst is inadequate to prevent acceptable video recording of the modified video signal; and
   a logic circuit coupled to the phase detector portion to generate a signal for controlling use of the video signal responsive to the detection of incorrect phase, wherein a length of the incorrect color burst is extended beyond that of a normal color burst.

26. Apparatus for controlling use of video content, comprising:
   an input terminal for receiving a video signal;
   a phase detector portion coupled to the input terminal to detect in the video signal a weakened color stripe signal in selected lines of the video signal, the weakened color stripe signal being an incorrect color burst in a horizontal blanking interval of the selected lines, wherein the incorrect color burst is inadequate to prevent acceptable video recording of the modified video signal; and
   a logic circuit coupled to the phase detector portion to generate a signal for controlling use of the video signal responsive to the detection of incorrect phase, wherein a phase angle shift of subcarrier cycles in the incorrect color burst is at least 120° from normal.

27. Apparatus for controlling use of video content, comprising:
   an input terminal for receiving a video signal;
   a phase detector portion coupled to the input terminal to detect in the video signal a weakened color stripe signal in selected lines of the video signal, the weakened color stripe signal being an incorrect color burst in a horizontal blanking interval of the selected lines, wherein the incorrect color burst is inadequate to prevent acceptable video recording of the modified video signal; and
   a logic circuit coupled to the phase detector portion to generate a signal for controlling use of the video signal responsive to the detection of incorrect phase, wherein the weakened color stripe signal encodes one of a plurality of content control states and the logic circuit decides the content control states.

* * * * *